USOO9253722B2

(12) United States Patent
Gobriel et al.

(10) Patent No.: US 9,253,722 B2
(45) Date of Patent: Feb. 2, 2016

(54) NETWORK INTERFACE FOR REDUCED HOST SLEEP INTERRUPTION

(75) Inventors: Sameh Gobriel, Dublin, CA (US); Christian Maciocco, Portland, OR (US); Kristoffer D Fleming, Chandler, AZ (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,324

(22) PCT Filed: Mar. 2, 2012

(86) PCT No.: PCT/US2012/027465
§ 371 (c)(1),
(2), (4) Date: Sep. 19, 2014

(87) PCT Pub. No.: WO2013/130097
PCT Pub. Date: Sep. 6, 2013

(65) Prior Publication Data
US 2015/0029915 A1 Jan. 29, 2015

(51) Int. Cl.
*H04W 52/02* (2009.01)
*H04L 29/08* (2006.01)
*H04L 12/12* (2006.01)
*H04L 12/861* (2013.01)

(52) U.S. Cl.
CPC ........... *H04W 52/0209* (2013.01); *H04L 12/12* (2013.01); *H04L 49/90* (2013.01); *H04L 49/9063* (2013.01); *H04L 69/32* (2013.01); *H04W 52/0219* (2013.01); *Y02B 60/50* (2013.01)

(58) Field of Classification Search
None
See application file for complete search history.

(56) References Cited

U.S. PATENT DOCUMENTS

| 7,908,502 B2 * | 3/2011 | Park ............................... 713/324 |
| 7,953,032 B2 * | 5/2011 | Liang ............................. 370/311 |
| 8,078,892 B2 | 12/2011 | Satoh |

(Continued)

FOREIGN PATENT DOCUMENTS

| JP | 2010166310 A | 7/2010 |
| WO | WO-2013130097 A1 | 9/2013 |

OTHER PUBLICATIONS

International Application Serial No. PCT/US2012/027465, Search Report mailed Oct. 23, 2012, 3 pgs.

(Continued)

*Primary Examiner* — Hassan Phillips
*Assistant Examiner* — Saba Tsegaye
(74) *Attorney, Agent, or Firm* — Schwegman Lundberg & Woessner, P.A.

(57) ABSTRACT

Systems and techniques for reduced host sleep interruption are described herein. A first packet received via a receive chain may be placed into a buffer. The first packet may be of a first preliminary type. The first packet may be processed from the buffer without communication with the host machine. The first packet may also be of a first secondary type. Processing the first packet may include an operation chosen from the group of dropping the packet and responding to the packet. A second packet received via the receive chain may be placed into the buffer. The second packet may be of a first preliminary type and a second secondary type. The second packet may be communicated from the buffer to the machine. A third packet received via the receive chain may be communicated to the machine. The third packet may be of a second preliminary type.

25 Claims, 3 Drawing Sheets

(56) References Cited

U.S. PATENT DOCUMENTS

| | | | |
|---|---|---|---|
| 8,917,742 B2* | 12/2014 | Ertugay et al. | 370/419 |
| 2007/0237122 A1* | 10/2007 | Liu et al. | 370/338 |
| 2008/0207230 A1* | 8/2008 | Jung et al. | 455/458 |
| 2009/0100281 A1* | 4/2009 | Watanabe et al. | 713/323 |
| 2010/0165897 A1 | 7/2010 | Sood | |
| 2011/0213992 A1 | 9/2011 | Satsangi et al. | |

OTHER PUBLICATIONS

International Application Serial No. PCT/US2012/027465, Written Opinion mailed Oct. 23, 2012, 5 pgs.

"International Application Serial No. PCT/US2012/027465, International Preliminary Report on Patentability mailed Sep. 12, 2014", 7 pgs.

* cited by examiner

NETWORK INTERFACE FOR REDUCED HOST SLEEP INTERRUPTION

PRIORITY APPLICATIONS

This application is a U.S. National Stage Application under 35 U.S.C. 371 from International Application No. PCT/US2012/027465, filed Mar. 2, 2012, which is hereby incorporated by reference in its entirety.

BACKGROUND

Network interfaces for a machine may couple a host machine to a network. Example network interfaces may include network interface cards (NICs) or similar hardware. The network may be wireless or wired. A network interface may include a receive chain. A receive chain may include components such as an antenna or a wired connector to connect the host network interface to the network. The network may be a packet (e.g., frame) based network. A packet based network may have broadcast, multicast, and unicast packets.

The machine may have an idle mode all the way down to various sleep modes where the lowest sleep mode provides the greatest energy benefit has the longest exit latency. Generally, the idle or sleep modes may cause most of the host machine's components to power down or to operate in a low power mode. Generally, when in a powered down or a low power mode, the components can process wake events and nothing else.

Generally, packets received by the network interface are communicated to the machine. This communication wakes an idle or sleeping machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Machine (e.g., host machine) power saving while in idle or sleep mode may be reduced if the time between wake-ups is small. In battery powered machines, the reduction in power savings may reduce battery life below acceptable limits. Buffering incoming packets may increase the time between machine wake-ups and thus increase power savings. In an example, incoming packets may be buffered until a threshold is met. In an example, the threshold may be a period of time, a number of received packets, or other criteria. This buffering, however, occurs regardless of the type of packets received.

Packet based networks may include a number of packets that may be classified as background packets (e.g., noise). In an example, background packets, as opposed to foreground packets, will not be processed by the network interface or the machine or the background packets are packets in which the host is not interested. Example background packets can include broadcast or multicast discovery packets for a service or entity not hosted by the machine and unicast packets not addressed to the machine. Processing background packets in the network interface, without waking the machine, can increase the time between machine wake-ups and thus increase power savings.

Network interfaces generally have very little time (e.g., 7-8 microseconds) to process an incoming packet before the next packet arrives, for example, in a wireless network operating in accordance with IEEE 802.11n using packet aggregation. This time may be insufficient to completely determine whether the packet is a background or a foreground packet. In an example, the determination of whether the packet is a background packet can be divided into two operations, a preliminary operation and a secondary operation. The preliminary operation may be simple and operate within the short inter-packet arrival time.

In an example, background traffic may be multicast (e.g., broadcast) traffic to which the machine will not respond immediately and foreground traffic may be all other traffic. In an example, multicast traffic may be expected, by the network, to endure delay. In an example of an IEEE 802.11 family of standards wireless network, the delay may allow an access point to align multicast or broadcast traffic to an 802.11 traffic indication map (TIM) interval. Such an expectation of delay permits multicast traffic to be delayed to the machine regardless of its status as background or foreground traffic. In an example, the preliminary operation can check a packet to determine if it is background traffic by checking to see if the packet is a multicast packet (or other simple filed lookups such as protocol type). Multicast packets may be buffered for the secondary operation.

In an example, the network interface may enter a power save mode under one or more conditions. For example, the network interface may save power by entering the power save mode after an idle timeout. In this example, the network access point may receive a notification of the power save mode and buffer incoming packets. Thus, no messages will be received by the receive chain. Because no further messages will be received, the network interface may perform the secondary operation on any packets stored in the buffer. If the secondary operation determines that the packet is a background packet the network interface may drop (e.g., discard) the packet. In an example, if the secondary operation determines that the packet may be responded to by the network interface without communicating with the machine, the network interface may respond to the packet. Packets that the network interface may respond to itself may include address resolution protocol packets, media server host services requests, etc. Other packets, if any, may be forwarded to, and dealt with by, the machine.

Generally, the machine may process any packets delivered by the network interface in a very short time. Accordingly, there is no significant difference in processing time for the machine between processing a single packet or many packets. This may be known as the batch property. The batch property allows the network interface to avoid processing some packets by offloading any unprocessed packets to the machine when a packet is encountered that requires the machine to be awoken. In an example, the network interface releases all packets, regardless of type, to the machine when one packet is released to the host machine. Further, releasing all packets in, for example, the buffer used for the preliminary operation, complicated buffer operations may be avoided. For example, if the buffer is a simple circular buffer with a head and tail pointer, removing an entry that is not at the beginning or end of the buffer may invoke complex pointer operations, or entry shifting, to maintain the buffer's integrity. These buffer operations may be needless if the network interface may simply send background packets to the machine when a foreground packet is sent to the machine.

Machine power savings may be increased by maximizing the number of packets processed by the network interface without awaking the machine. To compensate for limited processing ability on the network interface, a two stage process may be used to preliminarily determine if the packet should be immediately sent to the machine or may be buffered. A secondary stage may process buffered packets when the network will not send further packets for an extended period of time, such as when the network interface has entered a network power save mode. In this way, the problem of limited machine sleep time leading to reduced power savings may be avoided.

Figure 1:
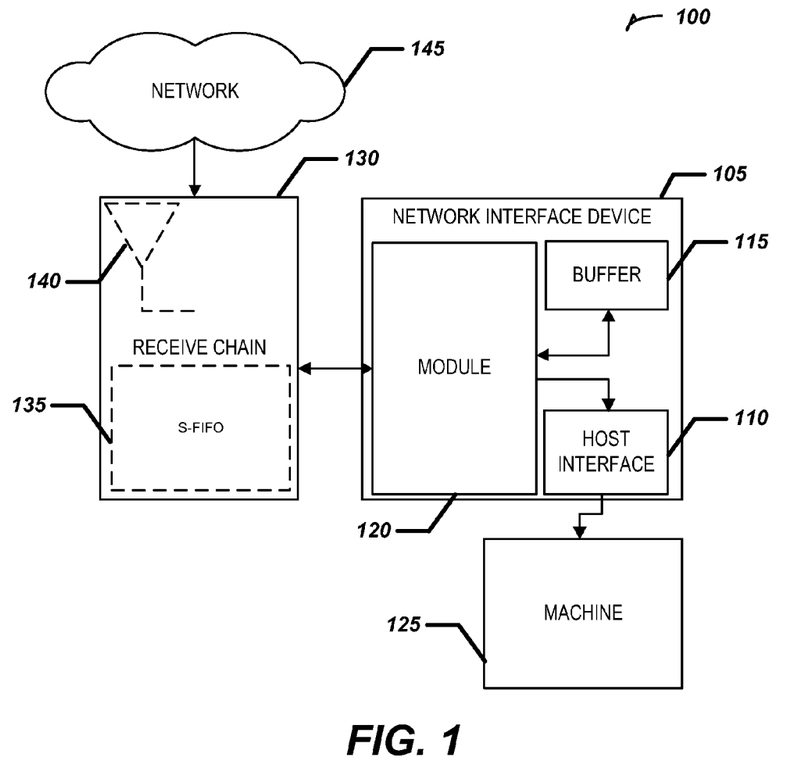
FIG. 1 illustrates an example of a system for reduced host sleep interruption, according to an embodiment.

FIG. 1 illustrates an example of a system 100 for reduced host sleep interruption. The system 100 may include a network interface device 105. The network interface device 105 may include a host interface 110, a buffer 115, and a module 120 coupled to the buffer 115 and the host interface 110. The system 100 may include a receive chain 130 coupled to a network 145 and the network interface device 105. The system 100 may include a machine (e.g., host machine) coupled to the host interface 110. In an example, the receive chain 130 and the network interface device 105 may be packaged together as a network interface for the machine 125. In an example the network 145 is a wireless network 145. In an example, the network 145 operates in accordance with an 802.11 family of standards.

The host interface 110 may be to the machine 125 while the machine 125 is asleep. The host interface 110 may be configured to communicate data (e.g., packets) from the network interface device 105 to the machine 125. The machine 125 may be configured to wake-upon receipt of the data from the host interface 110. In an example, the host interface 110 may include a bus, a controller, a number of wires, etc., to connect the network interface device 105 to the machine 125.

In an example, the receive chain 130 may comprise a smart first-in first-out device 135, known as a Smart-FIFO (S-FIFO). The S-FIFO 135 may be configured to buffer one or more received packets for a predetermined period of time prior to releasing the one or more packets to the module 120. In an example, the S-FIFO 135 may be configured to buffer the one or more received packets until a predetermined number of packets have been received. In an example, the receive chain may comprise an antenna 140 to communicate with the network 145 that is wireless.

The module 120 may be configured to receive a packet via the receive chain 130. In an example, the packet may be one of the one or more packets released by the S-FIFO 135.

The module 120 may be configured to determine, using a first analysis operation, a preliminary packet type for the packet. In an example, the first analysis operation may include the module 120 configured to check the packet for a multicast property. In an example, the multicast property is a multicast bit. In this example, the first preliminary type may include (e.g., indicate) the multicast property. In an example, the second preliminary type may not include the multicast property (e.g., the multicast bit is not set for the packet). In an example, the preliminary type may exclusively be either the first preliminary type or the second preliminary type. In an example, the first preliminary type indicates a possible background packet. In an example, the second preliminary type indicates that the packet should be sent to the machine 125.

The module 120 may be configured to place in the buffer 115, in response to determining that the packet is of a first preliminary type, the packet. In an example, the module 120 may be configured to increment a first preliminary type counter in response to determining that the packet is of a first preliminary type.

The module 120 may be configured to communicate, in response to determining that the packet is of a second preliminary type, the packet to the machine 125 using the host interface 110. In an example, in response to determining that the packet is of the second preliminary type, the module 120 may be configured to communicate all of the one or more packets released from the S-FIFO 135 to the machine 125 using the host interface. For example, the module 120 may be configured to keep a counter of the received packets. The module 120 may also be configured to compare the counter of received packets to the first preliminary type counter. If the two counters represent different values (e.g., not all packets are of the first preliminary type), then all of the packets are released to the machine 125.

The module 120 may be configured to determine, in response to deactivation of the receive chain 130 using a second analysis operation, a secondary packet type for the packet in the buffer 115. In an example, the second analysis operation may include the module 120 configured to check the packet for a no-host property. The no-host property may indicate that the network interface device 105 may process the packet without the machine 125. Example no host properties can include requests for an address, media service offering (e.g., catalog) requests, etc. In this example, the first secondary type may include (e.g., indicate) the no-host property. In an example, the second secondary type may not include the no-host property.

In an example, the module 120 may be configured to deactivate the receive chain 130 upon receipt of a power save mode notification from an access point of the network 145. In an example, the module 120 may be configured to communicate, in response to an idle period, a power save mode notification to an access point of the network 145. In an example, the module 120 may be configured to deactivate the receive chain 130.

The module 120 may be configured to process, in response to determining that the packet is of a first secondary type, the packet from the buffer 115 without communicating with the machine 125. Accordingly, the machine 125 is not awoken in this example. In an example, to process the packet in response to determining that the packet is of a first secondary type, the module 120 may be configured to drop the packet. In an example, to process the packet in response to determining that the packet is of a first secondary type, the module may be configured to respond to the packet.

The module 120 may be configured to communicate, in response to determining that the packet is of a second secondary type, the packet to the machine 125 using the host interface 110. In an example, in response to determining that the packet is of a second secondary type, the module 120 may be configured to communicate all packets in the buffer 115 to the machine 125 using the host interface 110. Thus, the batch property may be used once it is determined that the machine 125 will be awoken.

In an example, the module 120 may comprise one or more sub-modules (e.g., a first module and a second module). Each sub-module may individually perform an operation the module 120 is configured to perform, as described above. That is, the module 120, may include a number of hardware components to facilitate it's operations.

Figure 2:
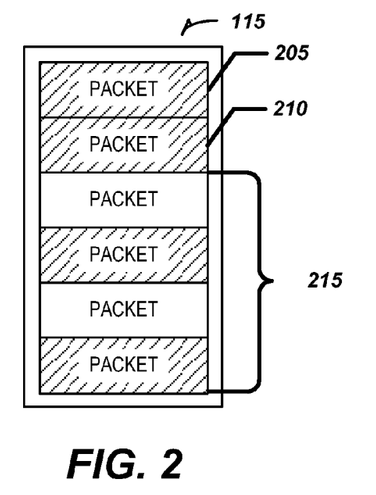
FIG. 2 illustrates an example of a buffer containing packets of various secondary types, according to an embodiment.

FIG. 2 illustrates an example of a buffer 115 containing packets of various secondary types. All of the packets are of the first preliminary type. Packets of the first secondary type are shaded and packets of the second secondary type are un-shaded.

The second analysis operation may pop (e.g., removed from the top of) packets from the buffer 115. The first packet 205 is popped and processed by the module 120. This processing may include, as described with respect to FIG. 1, dropping the first packet 205 or responding to the first packet 205 without waking the machine 125. After the first packet is popped, the second packet 210 may be processed by the module 120 in the same manner as the first packet 205.

The remaining packets 215 in the buffer 115 include a packet of the second secondary type at the top of the remaining packets 215. Accordingly, all of the remaining packets 215 may be communicated, by the module 120, to the machine 125 via the host interface 110. This is an example of using the batch property to avoid needless network interface device 105 processing, such as analyzing the remaining packets 215 or performing buffer operations to maintain the integrity of the buffer 115 if, as illustrated, a later packet would be dropped or processed.

Figure 3:
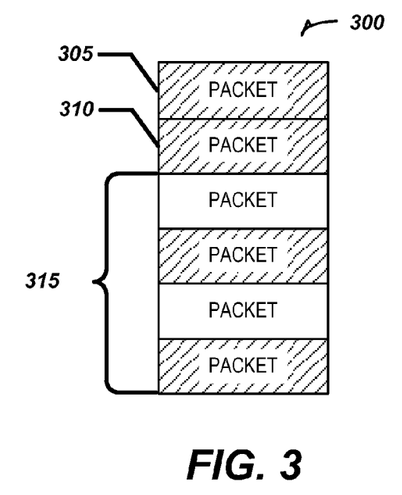
FIG. 3 illustrates an example of a set of packets of various preliminary types, according to an embodiment.

FIG. 3 illustrates an example of a set of packets 300 of various preliminary types. The set of packets 300 may originate from a S-FIFO 135 release to the module 120. Packets of the first preliminary type are shaded and packets of the second preliminary type are un-shaded.

The first analysis operation may process packets in the set of packets 300 from the top to the bottom. The first packet 305 may be checked to determine its preliminary type and stored in the buffer 115, or simply counted. The second packet 310 may be checked to determine its preliminary type and stored in the buffer. The remaining packets 315 are headed by a packet of the second preliminary type. Thus, all of the packets (packets 305 and 310 and the remaining packets 315) may be communicated to the machine 125 by the module 120 via the host interface 110.

Figure 4:
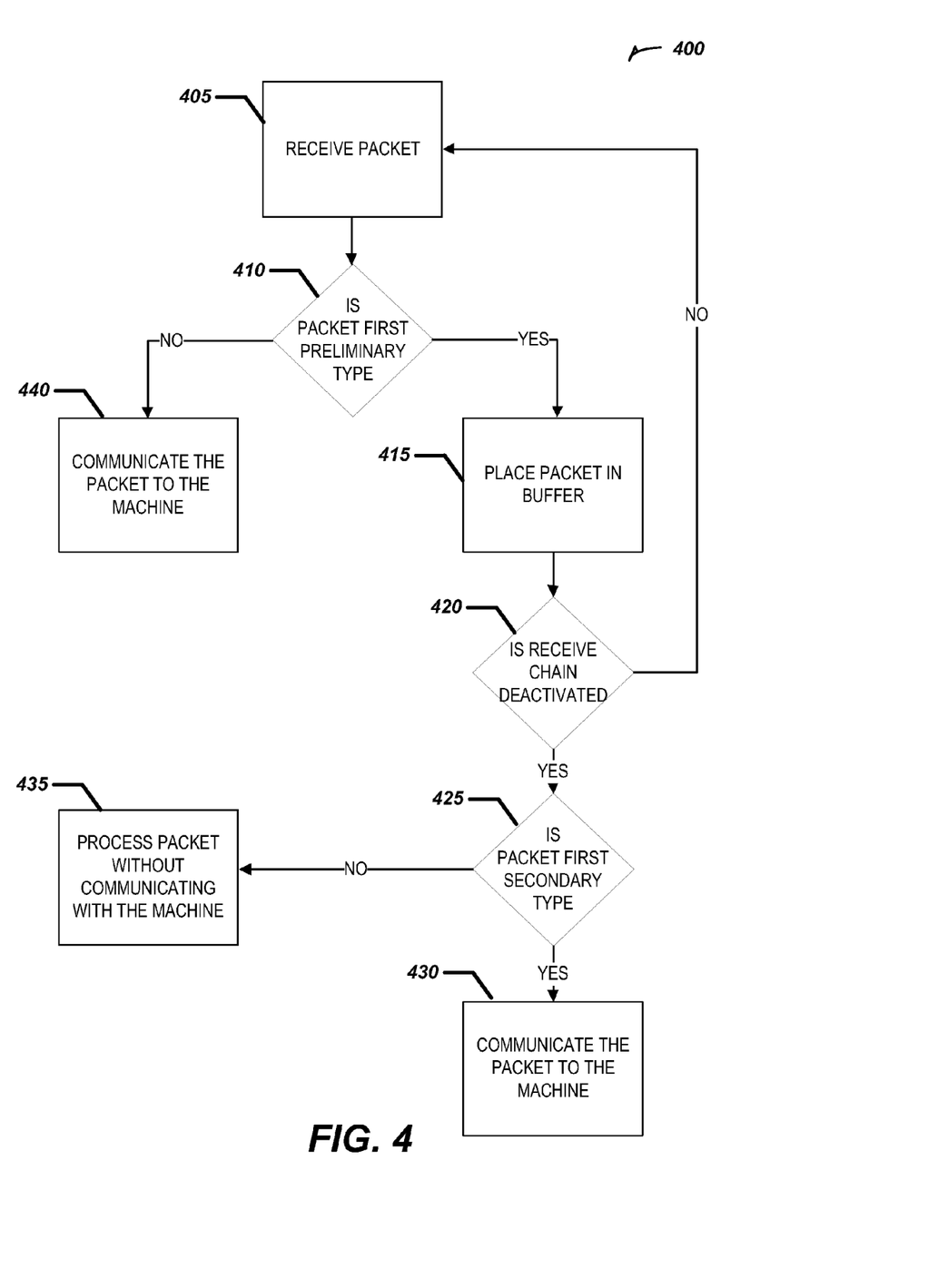
FIG. 4 illustrates an example of a method for reduced host sleep interruption, according to an embodiment.

FIG. 4 illustrates an example of a method 400 for reduced host sleep interruption. One or more components described with respect to FIG. 1 may implement one or more of the operations of the method 400. For clarity, these components are described performing the operations. However, other hardware, or software running on hardware, may be used in place of these components to perform the operations.

At operation 405, a packet may be received via the receive chain 130. The receive chain 130 may couple the network interface device 105 to the network 145. In an example, a host interface 110 of the network interface device 105 may be configured to communicate data from the network interface device 105 to a host machine 125. In an example, the host machine 125 may be configured to wake-upon receipt of the data from the host interface 110.

At operation 410, a preliminary packet type for the packet may be determined, for example by the module 120, using a first analysis operation. The packet may be preliminarily processed, for example by the module 120, based on the determined preliminary packet type. In an example, the first analysis operation may include checking the packet for a multicast property. In an example, the first preliminary type may include the multicast property. In an example, the second preliminary type may not include the multicast property. In an example, the first and second preliminary types are the only preliminary types.

At operation 415, the packet may be placed in the buffer 115 if the packet is of the first preliminary type.

At operation 420, an activation status of the receive chain may be determined, for example, by the module 120.

At operation 425, in response to deactivation of the receive chain 130, a secondary packet type may be determined for the packet in the buffer 115 using a second analysis operation. The packet in the buffer 115 may be secondarily processed, for example by the module 120, based on the determined secondary packet type. In an example, the second analysis operation may include checking the packet for a no-host property. In an example, the first secondary type may include the no-host property. In an example, the second secondary type may not include the no-host property. In an example, the no-host property may indicate that the network interface device 105 may process the packet without the host machine 125. In an example, the first and second secondary types are the only secondary types. In an example, the second analysis operation may continue checking other packets in the buffer 115. In an example, the second analysis operation may cease checking packets in the buffer 115 after a time-out period has elapsed and release the remaining packets to the machine 125.

At operation 430, the packet may be processed, for example by the module 120, from the buffer 115 without communicating with the machine 125 if the packet is of the first secondary type. In an example, processing the packet from the buffer without communicating with the host machine may include dropping the packet. In an example, processing the packet from the buffer without communicating with the host machine may include responding to the packet.

At operation 435, the packet may be communicated, for example by the module 120, from the buffer 115 to the host machine 125 using the host interface 110 if the packet is of the second secondary type. In an example, all packets in the buffer 115 may be communicated to the host machine 125 using the host interface 115.

At operation 440, the packet may be communicated, for example by the module 120, to the host machine 125 using the host interface 110 if the packet is of a second preliminary type. In an example, the method 400 may optionally buffer one or more packets received from the network 145 in an S-FIFO 135 in the receive chain 130. In this example, the one or more packets may be released from the S-FIFO 135, where the one or more packets include the packet. In this example, all of the one or more packets may be communicated to the machine 125 via the host interface 115.

In an example, the network 145 is a wireless network 145. In an example, the wireless network 145 may operate in accordance with an IEEE 802.11 family of standards. In an example, the method 400 may optionally include deactivating the receive chain 130 upon receipt of a power save mode notification from an access point of the wireless network 145. In an example, the method 400 may optionally include communicating, in response to an idle period, a power save mode notification to an access point of the wireless network 145, and deactivating the receive chain 130.

Figure 5:
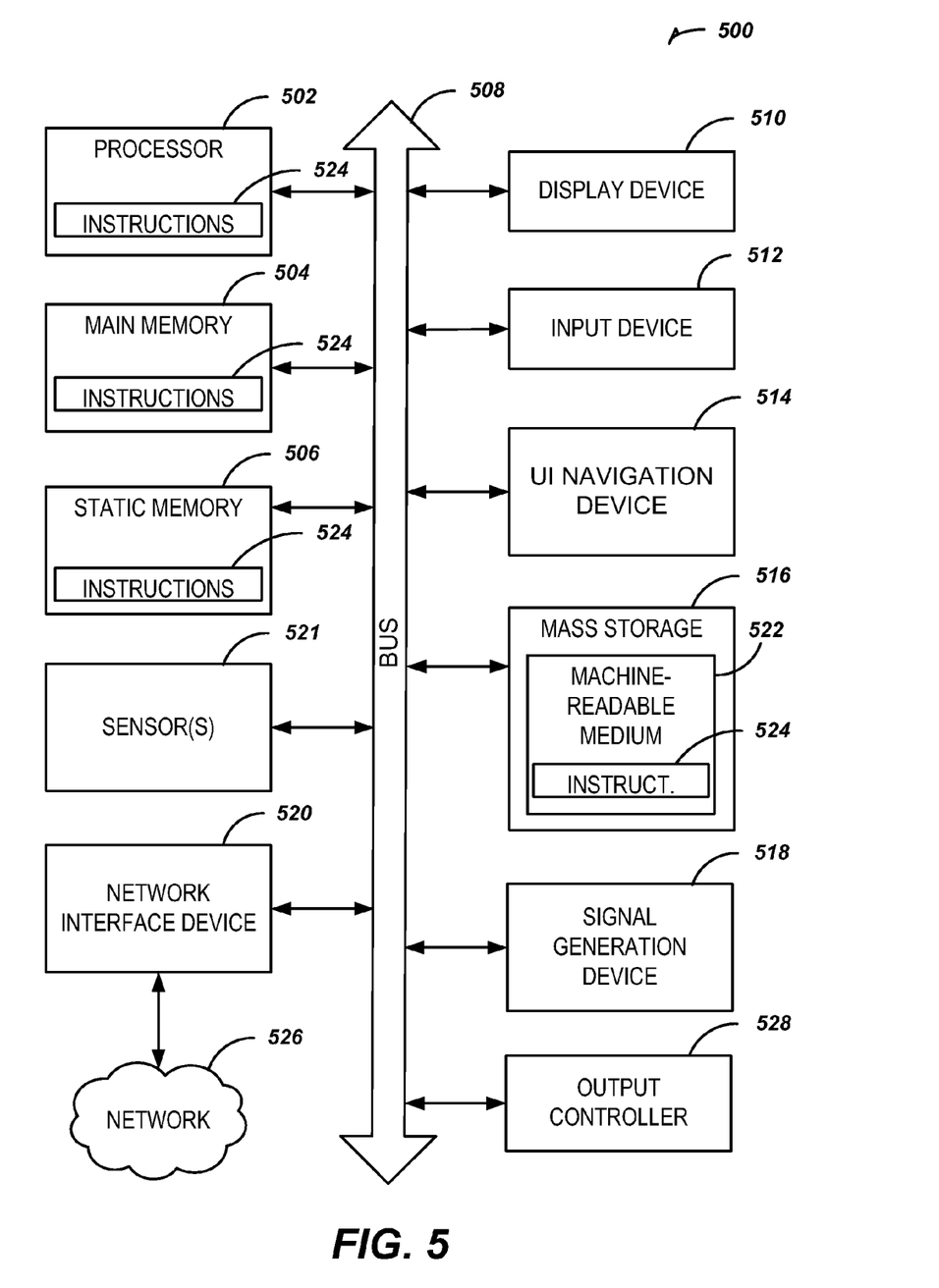
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., one or more hardware components) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via a bus 508. The machine 500 may further include a display unit 510, an alphanumeric input device 512 (e.g., a keyboard), and a user interface (UI) navigation device 511 (e.g., a mouse). In an example, the display unit 510, input device 517 and UI navigation device 914 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared(IR)) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) that configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES & EXAMPLES

Example 1 includes subject matter (such as a device, apparatus, or network interface device for reduced host sleep interruption) comprising a host interface coupled to a machine that is asleep, the host interface configured to communicate data from the network interface device to the machine, the machine configured to wake-upon receipt of the data from the host interface. The subject matter may also comprise a buffer and a module. The module may be configured to receive a packet via a receive chain, the receive chain coupling the network interface device to a network. The module may also be configured to determine, using a first analysis operation, a preliminary packet type for the packet. The module may also be configured to place in the buffer, in response to determining that the packet is of a first preliminary type, the packet. The module may also be configured to communicate, in response to determining that the packet is of a second preliminary type, the packet to the machine using the host interface. The module may also be configured to determine, in response to deactivation of the receive chain using a second analysis operation, a secondary packet type for the packet in the buffer. The module may also be configured to process, in response to determining that the packet is of a first secondary type, the packet from the buffer without communicating with the machine. The module may also be configured to communicate, in response to determining that the packet is of a second secondary type, the packet to the machine using the host interface.

In Example 2, the subject matter of Example 1 may optionally include a smart first-in first-out device, known as an S-FIFO, the S-FIFO in the receive chain and configured to buffer one or more received packets for a predetermined period of time prior to releasing the one or more packets to the module, the one or more packets including the packet. The subject matter of Example 1 may optionally include, wherein to communicate, in response to determining that the packet is of the second preliminary type, includes the module is configured to communicate all of the one or more packets to the machine using the host interface.

In Example 3, the subject matter of any one of Examples 1 and 2 may optionally include, wherein to communicate, in response to determining that the packet is of a second secondary type, includes the module configured to communicate all packets in the buffer to the machine using the host interface.

In Example 4, the subject matter of any one of Example 1-3 may optionally include, wherein the network is a wireless network.

In Example 5, the subject matter of Example 4 may optionally include, wherein the module is configured to deactivate the receive chain upon receipt of a power save mode notification from an access point of the wireless network.

In Example 6, the subject matter of any one of Examples 4 and 5 may optionally include, wherein the module is configured to communicate, in response to an idle period, a power save mode notification to an access point of the wireless network, and deactivate the receive chain.

In Example 7, the subject matter of any one of Examples 4-6 may optionally include, wherein the wireless network operates in accordance with an IEEE 802.11 family of standards.

In Example 8, the subject matter of any one of Examples 1-6 may optionally include, wherein the first analysis operation includes the module configured to check the packet for a multicast property, the first preliminary type including the multicast property, and the second preliminary type not including the multicast property.

In Example 9, the subject matter of any one of Examples 1-8 may optionally include, wherein the second analysis operation includes the module configured to check the packet for a no-host property, the first secondary type including the no-host property, the second secondary type not including the no-host property, and the no-host property indicating that the network interface device may process the packet without the machine.

In Example 10, the subject matter of any one of Examples 1-9 may optionally include, wherein to process, in response to determining that the packet is of a first secondary type, the packet from the buffer without communicating with the machine includes the module configured to drop the packet.

In Example 11, the subject matter of any one of Examples 1-10 may optionally include, wherein to process, in response to determining that the packet is of a first secondary type, the packet from the buffer without communicating with the machine includes the module configured to respond to the packet.

Example 12 may include, or may optionally be combined with the subject matter of any one of Examples 1-11 to include, subject matter (such as a method, means for performing acts, or machine readable medium including instructions that, when performed by a machine cause the machine to performs acts) comprising receiving a packet via a receive chain coupling a network interface device to a network, the network interface device including a buffer and a host interface, the host interface configured to communicate data from the network interface device to a host machine, the host machine configured to wake-upon receipt of the data from the host interface, determining a preliminary packet type for the packet using a first analysis operation, preliminarily processing the packet based on the determined preliminary packet type. The preliminary processing may include placing the packet in the buffer if the packet is of a first preliminary type, determining, in response to deactivation of the receive chain, a secondary packet type for the packet in the buffer using a second analysis operation, secondarily processing the packet in the buffer based on the determined secondary packet type. The secondary processing may include processing the packet from the buffer without communicating with the machine if the packet is of a first secondary type, and communicating the packet to the host machine using the host interface if the packet is of a second secondary type. Example 12 may also comprise communicating the packet to the host machine using the host interface if the packet is of a second preliminary type.

In Example 13, the subject matter of Example 12 may optionally include, buffering one or more packets received from the network in a smart first-in first-out device, known as an S-FIFO, the S-FIFO in the receive chain, and releasing the one or more packets from the S-FIFO after a predetermined period of time has elapsed, the one or more packets including the packet, and wherein to communicating the packet to the host machine using the host interface if the packet is of a second preliminary type includes, communicating all of the one or more packets to the host machine using the host interface.

In Example 14, the subject matter of any of Examples 12 and 13 may optionally include, wherein communicating the packet to the host machine using the host interface if the packet is of a second secondary type includes, communicating all packets in the buffer to the host machine using the host interface.

In Example 15, the subject matter of any of Examples 12-14 may optionally include, wherein the network is a wireless network.

In Example 16, the subject matter of Example 15 may optionally include, deactivating the receive chain upon receipt of a power save mode notification from an access point of the wireless network.

In Example 17, the subject matter of any one of Examples 15 and 16 may optionally include communicating, in response to an idle period, a power save mode notification to an access point of the wireless network, and deactivating the receive chain.

In Example 18, the subject matter of any one of Examples 15-17 may optionally include, wherein the wireless network operates in accordance with an IEEE 802.11 family of standards.

In Example 19, the subject matter of any one of Examples 12-18 may optionally include, wherein the first analysis operation includes checking the packet for a multicast property, the first preliminary type including the multicast property, and the second preliminary type not including the multicast property.

In Example 20, the subject matter of any one of Examples 12-19 may optionally include, wherein the second analysis operation includes checking the packet for a no-host property, the first secondary type including the no-host property, the second secondary type not including the no-host property, and the no-host property indicating that the network interface device may process the packet without the host machine.

In Example 21, the subject matter of any one of Examples 12-20 may optionally include, wherein processing the packet from the buffer without communicating with the host machine includes dropping the packet.

In Example 22, the subject matter of any one of Examples 12-21 may optionally include, wherein processing the packet from the buffer without communicating with the host machine includes responding to the packet.

Example 23 may include, or may optionally be combined with the subject matter of any one of Examples 1-22 to include, subject matter (such as a method, means for performing acts, or machine readable medium including instructions that, when performed by a machine cause the machine to performs acts) comprising placing a first packet received via a receive chain into a buffer, the first packet of a first preliminary type, the receive chain coupling a network interface device to a network, the network interface device including the buffer and a host interface, the host interface configured to communicate data from the network interface device to a machine, the machine configured to wake-upon receipt of the data from the host interface. The subject matter of Example 23 may also comprise processing the first packet from the buffer without communication with the machine, the first packet of a second secondary type, the processing of the first packet including an operation chosen from the group of dropping the packet and responding to the packet. The subject matter of Example 23 may also comprise placing a second packet received via the receive chain into the buffer, the second packet of the first preliminary type and a second secondary type. The subject matter of Example 23 may also comprise communicating the second packet from the buffer to the machine using the host interface. The subject matter of Example 23 may also comprise communicating a third packet received via the receive chain to the machine using the host interface, the third packet of a second preliminary type.

Example 24 may include, or may optionally be combined with the subject matter of any one of Examples 1-23 to include, subject matter (such as a device, apparatus, or network interface device for reduced host sleep interruption) comprising a buffer, and a first module and a second module. The first module may be configured to determine that a packet received via a wireless network does not need to be immediately processed by a sleeping machine and storing the packet in the buffer. The second module may be configured to determine, during a period of predetermined receive inactivity, that the packet stored in the buffer can be processed by the network interface device without waking the machine and processing the packet without waking the machine.

In Example 25, the subject matter of Example 24 may optionally include a smart first-in first-out device, known as a S-FIFO, the S-FIFO configured to buffer one or more packets received from the wireless network until a predetermined condition is met prior to releasing the one or more packets to the first module, and wherein the first module is configured to determine that a second packet in the one or more packets needs to be immediately processed by the sleeping machine and communicating all of the one or more packets to the machine.

In Example 26, the subject matter of one or any of Examples 24-25 may optionally include, wherein the first module is configured to determine that a second (or third) packet received via the wireless network does not need to be immediately processed by the machine and storing the second packet in the buffer. The second module may be configured to determine that the second packet cannot be processed by the network interface device without waking the machine and communicating the second packet and any other packets in the buffer to the machine.

In Example 27, the subject matter of one or any of Examples 24-26 may optionally include, wherein the period of predetermined receive inactivity is a power save mode period.

Example 28 may include, or may optionally be combined with the subject matter of any one of Examples 1-27 to include, subject matter (such as a method, means for performing acts, or machine readable medium including instructions that, when performed by a machine cause the machine to performs acts comprising determining, by a network interface device, that a packet received via a wireless network does not need to be immediately processed by a sleeping machine, storing the packet in a buffer of the network interface device, determining that the packet stored in the buffer can be processed by the network interface device without waking the machine, and processing the packet without waking the machine.

In Example 29, the subject matter of Example 28 may optionally include receiving a plurality of packets not including the packet, and determining that at least one packet in the plurality of packets needs to be immediately processed by the sleeping machine and communicating all of the plurality of packets to the sleeping machine.

In Example 30, the subject matter of one or any of Examples 28-29 may optionally include processing, during a power save mode period for the network interface device, packet in the buffer, determining that at least one packet in the packets cannot be processed by the network interface device without waking the machine, and communicating the packets to the sleeping machine.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network interface device for reduced host sleep interruption, the network interface device comprising:
   a buffer;
   a first module configured to determine that a packet received via a wireless network does not need to be immediately processed by a sleeping machine and storing the packet in the buffer; and
   a second module configured to:
      determine, during a period of predetermined receive inactivity, that the packet stored in the buffer can be processed by the network interface device without waking the machine; and
      processing the packet without waking the machine, wherein the period of predetermined receive inactivity is a network power save mode period in which an upstream network component is alerted that the network interface device is unavailable to receive packets and refrains from transmitting packets specifically destined to the network interface device.

2. The network interface device of claim 1 comprising a smart first-in first-out device, known as a S-FIFO, the S-FIFO configured to buffer one or more packets received from the wireless network until a predetermined condition is met prior to releasing the one or more packets to the first module; and
   wherein the first module is configured to determine that a second packet in the one or more packets needs to be immediately processed by the sleeping machine and communicating all of the one or more packets to the machine.

3. The network interface device of claim 1, wherein the first module is configured to determine that a second packet received via the wireless network does not need to be immediately processed by the machine and storing the second packet in the buffer; and
   wherein the second module is configured to determine that the second packet cannot be processed by the network interface device without waking the machine and communicating the second packet and any other packets in the buffer to the machine.

4. A network interface device for reduced host sleep interruption, the network interface device comprising:
   a host interface configured to be coupled to a machine that is either idle or asleep, the host interface configured to communicate data from the network interface device to the machine, the machine configured to wake-upon receipt of the data from the host interface;
   a buffer; and
   a module configured to:
      receive a packet via a receive chain, the receive chain coupling the network interface device to a network;
      determine, using a first analysis operation, a preliminary packet type for the packet;
      place in the buffer, in response to determining that the packet is of a first preliminary type, the packet;
      communicate, in response to determining that the packet is of a second preliminary type, the packet to the machine using the host interface;
      determine, in response to deactivation of the receive chain using a second analysis operation, a secondary packet type for the packet in the buffer;
      process, in response to determining that the packet is of a first secondary type, the packet from the buffer without communicating with the machine; and
      communicate, in response to determining that the packet is of a second secondary type, the packet to the machine using the host interface.

5. The network interface device of claim 4, comprising a smart first-in first-out device, known as an S-FIFO, the S-FIFO in the receive chain and configured to buffer one or more received packets for a predetermined period of time prior to releasing the one or more packets to the module, the one or more packets including the packet; and
   wherein to communicate, in response to determining that the packet is of the second preliminary type, includes the module is configured to communicate all of the one or more packets to the machine using the host interface.

6. The network interface device of claim 4, wherein to communicate, in response to determining that the packet is of a second secondary type, includes the module configured to communicate all packets in the buffer to the machine using the host interface.

7. The network interface device of claim 4, wherein the network is a wireless network.

8. The network interface device of claim 7, wherein the module is configured to deactivate the receive chain upon receipt of a power save mode notification from an access point of the wireless network.

9. The network interface device of claim 7, wherein the module is configured to:
communicate, in response to an idle period, a power save mode notification to an access point of the wireless network; and
deactivate the receive chain.

10. The network interface device of claim 7, wherein the wireless network operates in accordance with an IEEE 802.11 family of standards.

11. The network interface device of claim 4, wherein the first analysis operation includes the module configured to check the packet for a multicast property, the first preliminary type including the multicast property, and the second preliminary type not including the multicast property.

12. The network interface device of claim 4, wherein the second analysis operation includes the module configured to check the packet for a no-host property, the first secondary type including the no-host property, the second secondary type not including the no-host property, and the no-host property indicating that the network interface device can process the packet without the machine.

13. The network interface device of claim 4, wherein to process, in response to determining that the packet is of a first secondary type, the packet from the buffer without communicating with the machine includes the module configured to drop the packet.

14. The network interface device of claim 4, wherein to process, in response to determining that the packet is of a first secondary type, the packet from the buffer without communicating with the machine includes the module configured to respond to the packet.

15. A non-transitory machine readable medium comprising instructions that, when executed by the machine, cause the machine to perform operations for reduced host sleep interruption, the operations comprising:
receiving a packet via a receive chain coupling a network interface device to a network, the network interface device including a buffer and a host interface, the host interface configured to communicate data from the network interface device to a host machine, the host machine configured to wake-upon receipt of the data from the host interface;
determining a preliminary packet type for the packet using a first analysis operation;
preliminarily processing the packet based on the determined preliminary packet type, the preliminary processing including:
placing the packet in the buffer if the packet is of a first preliminary type; and
determining, in response to deactivation of the receive chain, a secondary packet type for the packet in the buffer using a second analysis operation;
secondarily processing the packet in the buffer based on the determined secondary packet type, the secondary processing including:
processing the packet from the buffer without communicating with the machine if the packet is of a first secondary type; and
communicating the packet to the host machine using the host interface if the packet is of a second secondary type; and
communicating the packet to the host machine using the host interface if the packet is of a second preliminary type.

16. The machine readable medium of claim 15, comprising:
buffering one or more packets received from the network in a smart first-in first-out device, known as an S-FIFO, the S-FIFO in the receive chain;
releasing the one or more packets from the S-FIFO after a predetermined period of time has elapsed, the one or more packets including the packet; and
wherein to communicating the packet to the host machine using the host interface if the packet is of a second preliminary type includes, communicating all of the one or more packets to the host machine using the host interface.

17. The machine readable medium of claim 15, wherein communicating the packet to the host machine using the host interface if the packet is of a second secondary type includes, communicating all packets in the buffer to the host machine using the host interface.

18. The machine readable medium of claim 15, wherein the network is a wireless network.

19. The machine readable medium of claim 18, comprising deactivating the receive chain upon receipt of a power save mode notification from an access point of the wireless network.

20. The machine readable medium of claim 18, comprising:
communicating, in response to an idle period, a power save mode notification to an access point of the wireless network; and
deactivating the receive chain.

21. The machine readable medium of claim 18, wherein the wireless network operates in accordance with an IEEE 802.11 family of standards.

22. The machine readable medium of claim 15, wherein the first analysis operation includes checking the packet for a multicast property, the first preliminary type including the multicast property, and the second preliminary type not including the multicast property.

23. The machine readable medium of claim 15, wherein the second analysis operation includes checking the packet for a no-host property, the first secondary type including the no-host property, the second secondary type not including the no-host property, and the no-host property indicating that the network interface device can process the packet without the host machine.

24. The machine readable medium of claim 15, wherein processing the packet from the buffer without communicating with the host machine includes responding to the packet.

25. A method for reduced host sleep interruption performed by a network interface device of a machine, the method comprising:
determining that a packet received via a network does not need to be immediately processed by the machine while sleeping;
storing the packet in a buffer of the network interface device;
determining a period of predetermined receive inactivity that is a network power save mode period in which an upstream network component is alerted that the network interface device is unavailable to receive packets and refrains from transmitting packets designated to the network interface device;
determining, during the period of receive inactivity, that the packet stored in the buffer can be processed by the network interface device without waking the machine; and
processing the packet without waking the machine.

* * * * *